(No Model.)
A. H. NOBLE.
BELT FASTENER.
No. 255,324. Patented Mar. 21, 1882.
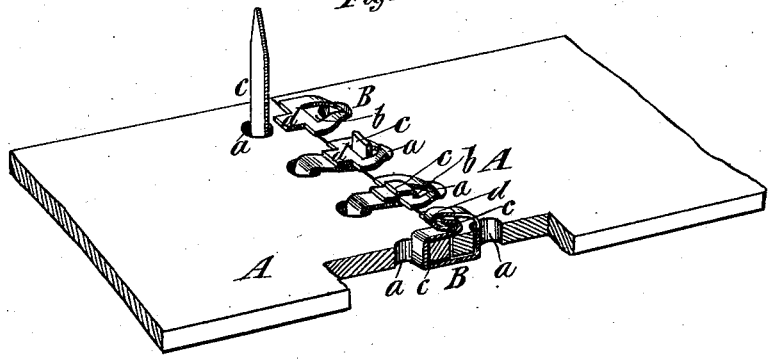
Witnesses
Fred R Raymer
Ed Moran
Inventor
Alfred H Noble
by his Attorneys
Brown & Brown
N. PETERS, Photo-Lithographer, Washington, D. C.

UNITED STATES PATENT OFFICE.

ALFRED H. NOBLE, OF NEW MILFORD, CONNECTICUT.

BELT-FASTENER.

SPECIFICATION forming part of Letters Patent No. 255,324, dated March 21, 1882.

Application filed December 27, 1881. (No model.)

*To all whom it may concern:*

Be it known that I, ALFRED H. NOBLE, of New Milford, in the county of Litchfield and State of Connecticut, have invented a new and Improved Belt-Fastener, of which the following is a specification.

My invention relates to metallic belt-fasteners which are used as substitutes for belt lacings in uniting the ends of driving-belts.

My invention consists in a belt-fastener composed of an open head or eye, a tongue or shank projecting therefrom and adapted to be inserted through holes in the meeting ends of a belt and through the head or eye and folded over, and a lip projecting from the head or eye opposite the tongue or shank, and less in width than said head or eye, whereby angular notches are formed at its juncture therewith, which facilitate the folding of said lip over the folded tongue or shank to hold it down.

In the accompanying drawings, Figure 1 represents a sectional perspective view of the two end portions of a belt united by my improved fasteners, showing the several steps taken in applying the fasteners, and Fig. 2 represents a face view of a fastener before it is applied.

Similar letters of reference designate corresponding parts in all the figures.

A A designate the two end portions of the belt, in which are punched the usual holes, $a$, and B designates the fasteners whereby the ends of the belt are united, and of which four are here shown. On one side I have shown the belt as broken away, so that the way in which the fasteners are bent will be more clearly seen.

Referring now to Fig. 2, it will be seen that the fastener is composed of an open head or eye, $b$, from which projects a tongue or shank, $c$, which is of such a width that it may be readily inserted into the open head or eye. On the side of the head or eye $b$ opposite the tongue or shank $c$ is a lip or ear, $d$, less in width than the head or eye, and the purpose of which I will explain hereinafter; and the fastener may be punched or stamped from sheet metal.

In applying these fasteners the tongue or shank $c$ is inserted through one hole $a$ from the outside of the belt, and is returned through the opposite hole, as is seen in the fastener on the opposite edge to that which is broken away. The shank or tongue is then cut off, and it and the open head or eye $b$ are folded or bent toward each other, and the shank or tongue is inserted under and through the open head or eye and bent upward, as seen in the second fastener from the edge, and is then closed down upon the head or eye, as seen in the third fastener from the edge. To additionally hold the shank or tongue $c$ in its closed position, the lip $d$ is closed down over it, as seen in the fastener at the edge which is broken away. Inasmuch as the lip $d$ is narrower than the head or eye $b$, as clearly shown in Fig. 2, angular notches are formed at the juncture of the lip and head or eye, which facilitate the bending of the lip and determine where it shall be folded.

It will be observed that by these fasteners the ends of belts may be so securely united that their strength will only be limited by their resistance to rupture through the punched holes; and the fasteners give the belt a smooth interior surface, even smoother than when a belt-lacing is used.

What I claim as my invention, and desire to secure by Letters Patent, is—

The metallic belt-fastener composed of the open head or eye $b$, the tongue or shank $c$, and the lip $d$ on the opposite side of the head or eye from said tongue or shank, and made less in width than said head or eye, so as to form angular notches at its juncture therewith, substantially as and for the purpose specified.

ALFRED H. NOBLE.

Witnesses:
CHARLES H. NOBLE,
GEO. S. BEERS.